(12) United States Patent
Grasz (10) Patent No.: US 11,698,274 B2
(45) Date of Patent: Jul. 11, 2023

(54) HOLDER FOR A MAGNET, REGULATION VALVE POSITION DETECTOR, AND REGULATING VALVE

(71) Applicant: SAMSON AKTIENGESELLSCHAFT, Frankfurt (DE)

(72) Inventor: Matthias Grasz, Großostheim (DE)

(73) Assignee: Samson Aktiengesellschaft, Frankfurt (DE)

( * ) Notice: Subject to any disclaimer, the term of this patent is extended or adjusted under 35 U.S.C. 154(b) by 285 days.

(21) Appl. No.: 16/575,626

(22) Filed: Sep. 19, 2019

(65) Prior Publication Data
US 2020/0088547 A1    Mar. 19, 2020

(30) Foreign Application Priority Data
Sep. 19, 2018    (DE) ...................... 20 2018 105 378.7

(51) Int. Cl.
| | | |
|---|---|---|
| *G01D 5/14* | (2006.01) | |
| *G01B 7/30* | (2006.01) | |
| *F16K 31/50* | (2006.01) | |

(52) U.S. Cl.
CPC .......... *G01D 5/145* (2013.01); *F16K 31/508* (2013.01); *G01B 7/30* (2013.01)

(58) Field of Classification Search
CPC .......... G01D 5/145; G01B 7/30; F16K 31/508
See application file for complete search history.

(56) References Cited

U.S. PATENT DOCUMENTS

| | | | |
|---|---|---|---|
| 5,055,781 A | 10/1991 | Sakakibara et al. | |
| 7,847,446 B2 * | 12/2010 | Becker | G01P 1/04 |
| | | | 310/68 B |
| 9,341,282 B2 * | 5/2016 | Robson | F16K 5/04 |
| 9,435,630 B2 * | 9/2016 | Storrie | F15B 15/10 |
| 9,528,623 B2 * | 12/2016 | Jantz | F16K 27/0281 |
| 2018/0135960 A1 * | 5/2018 | Mellinger | G01D 11/30 |
| 2018/0354812 A1 * | 12/2018 | McConkey | C02F 1/008 |
| 2020/0041020 A1 * | 2/2020 | Uehara | F16K 31/0679 |

FOREIGN PATENT DOCUMENTS

FR    2992046 A1 * 12/2013 ............. F02M 26/53

* cited by examiner

*Primary Examiner* — Reena Aurora
(74) *Attorney, Agent, or Firm* — Banner & Witcoff Ltd.

(57) ABSTRACT

A holder for a magnet of a magnet sensitive regulating valve position detector of a regulating valve of a process plant. The detector can include a shaft turnably movable supported in a housing of the detector, the shaft defining a turning axis oriented parallel to a turning spring supporting itself at the housing, and having a lever arm being turnably fixed with the shaft, the lever arm being coupled to the regulating valve such that a regulating valve stroke movement by the lever arm is transferable into a shaft rotation movement. The holder includes a holding fixture to interlockingly hold the magnet, a fixing section connected to the holding fixture to fix the holder at the shaft turnably fixedly, and a support connected to the holding fixture and the fixing section to latchingly support the rotational spring to generate a rotational spring force on shaft rotation movement.

21 Claims, 4 Drawing Sheets

HOLDER FOR A MAGNET, REGULATION VALVE POSITION DETECTOR, AND REGULATING VALVE

CROSS REFERENCE TO RELATED APPLICATIONS

This patent application claims priority to German Patent Application No. 202018105378.7, filed Sep. 19, 2018, which is incorporated herein by reference in its entirety.

BACKGROUND

Field

The present disclosure relates to a holder for a magnet and a magnet-sensitive regulation valve position detection device of a regulating valve of a process plant, like a chemical plant, a food processing plant, a power plant or the like. Moreover, the present disclosure relates to a regulating valve position detection device for a regulating valve of a process plant. Furthermore, a regulating valve for regulating the process fluid flow in a process plant is provided by the present disclosure.

Related Art

Regulating indicators with a sensor-magnet assembly for capturing the position of a regulating device of a valve are known in general. Regulation indicators subject to the disclosure have a housing in which the shaft is supported rotatably movable and connected rotatably fixed with a lever arm. The lever arm is coupled to the regulating valve, so that the regulating valve stroke movement is transmitted through the lever arm into a shaft rotation movement, which is detected via a sensor-magnet assembly. The regulating device position can be concluded from the detective shaft rotation movement. Conventionally, a specifically high accuracy on capturing the shaft rotation movement can be obtained by the sensor-magnet assembly, if the magnet-sensitive sensor is positioned more or less central and above the magnet.

As an example, a magnet-sensitive rotation angle sensor for capturing the regulating valve position is shown in U.S. Pat. No. 5,055,781. A magnet that is associated and facing a magnet-sensitive sensor is directly mounted on a front face of the shaft. The magnet is furthermore overmolded by a plastic coating involving an inseparable connection between magnet and shaft. This results in a disadvantageous assembly/disassembly situation, because, particularly in case of service the magnets, the shaft and the plastic coating can only be exchanged as a unit.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

Applicant has found that a certain play and/or a certain delay between regulating valve stroke movement and shaft rotation movement are present on known regulating indicator solutions, which on the one hand have a negative impact on the ability to react of the regulating control and on the other hand a negative impact on the accuracy of the regulating indicator.

An object of the present disclosure is to provide a regulating valve position detection device on which it is assured that the position detection is much more precise and has little as possible delay. Another object is to provide a holder for the magnet of such regulating valve position detection devices, which allows a detection of the regulating valve position as accurate and delay-free as possible as well as assembly/disassembly as easy as possible and particularly fulfills further functions within the regulating valve position detection device.

In an exemplary embodiment of the present disclosure, a holder for a magnet of a magnet-sensitive regulating valve position detection device of a regulating valve of a process plant, like a chemical plant, a food processing plant, a power plant or such is provided.

In an exemplary embodiment, the magnet-sensitive regulating valve position detection device is based on the function principle of the measurability of changes in the magnetic field. In an exemplary embodiment, the regulating valve position detection device has a shaft that is supported rotatably movable in a housing of the regulating valve position detection device. The shaft defines a rotation axis that extends parallel to a rotational spring supporting on the housing. The regulating valve position detection device further has a lever arm rotatably fixed to a shaft that is coupled to the regulating valve in such a way that a regulating valve stroke movement is transmittable into a shaft rotation movement by the lever arm. A pin that can be at positioned at different locations at the lever arm cooperates with a connecting member fixed to the regulating valve and thereby translated the stroke movement into rotation movement. It shall be clear that different stroke amplitudes can be taped by different lever arms lengths and by different positions of the pins at the lever arm. The pin is, as an example, guided in an oblong hole that is formed inside the connecting member, wherein, for example, also an edge can be sufficient for guiding the pin. Furthermore, press-on rollers can be aligned between the lever arm and the connecting member in such a way that when transferring the regulating valve stroke movement into a shift turning movement, a relative movement between a contact point of the lever arm and a connecting member is associated so that the press-on rollers can roll off the connecting member in order to allow a guided, preferably wear-free, relative movement. Furthermore, a magnet-sensitive rotation angle sensor can be aligned at the housing of the regulating valve position device for capturing the shaft rotation movement, wherein especially the magnet-sensitive rotation angle sensor is facing the magnet in such a way that a change in the magnetic field is detected on shaft rotation movement. The shaft rotation movement and therefore the regulating valve stroke movement can be concluded from that change, from which the regulating valve position detection can be deduced.

In an exemplary embodiment, the holder includes a holding fixture, such as a receptacle, configured to hold (e.g. clampingly hold) the magnet. The clamping of the magnet has the advantage of an easy and fast assembly. Furthermore, no further fixing elements are needed, whereas it is also possible to provide further fixing parts. As an example, the magnet may be clamplingly held within an interior of the receptacle. The magnet may be glued or casted within the receptacle. The magnets, for example can be a long stretched arm magnet, preferably permanent magnet. The magnet can for example be completely receivable in the receptacle. Furthermore, the receptacle can be dimensioned in such a way, that it encompasses the magnets at least partly, particularly completely. It is furthermore possible that the magnet, especially bar magnet, is encased at least at one of the distal end, preferably for about ⅓ to ½ of the complete lengthwise extension of the magnet. Particularly, the magnet is flushed with the receptacle in a direction transverse to the longitudinal extension of the magnet especially perpendicular direction so that the magnet in particular does not protrude from the receptacle.

In an exemplary embodiment, the holder also includes a fixing section 37 configured to fix the holder to the rotatably fixed shaft 13 that is connected to the receptacle, particularly made in one piece. The holder is therefore fixed to the shaft by the fixing section in such a way that the shaft rotation movement is directly transmitted into a holder rotation movement. In other words, the holder is rotating with the shaft as a result of a regulating valve stroke movement. As an example, the fixing section is dimensioned in such a way that the holder can be mounted in the direction of the shaft rotation axis on the shaft and that the fixing section for fixing the holder on the shaft is in contact with the perimeter/shell surface of the shaft at least at parts of the sections. Furthermore, reinforcing and/or securing parts for fixing the holder on the shaft can be present, which can be mounted preferably in direction of the shaft rotation axis on the shaft.

In an exemplary embodiment, the holder includes a support section that is connected to the receptacle and to the fixing section particularly made in one piece with the receptacle and the fixing section. The support section particularly serves as an interlocking support of the rotational spring, which is also supported at the housing of the regulating valve position detection device in order to build up a rotational spring force on shaft rotation movement. By means of the holder according to the disclosure, significantly more precise position detection at preferably low delay can be achieved, since an initial spring load of the shaft is present by means of the rotational spring force provided by the rotational spring. Thereby a play between the regulating valve stroke movement and shaft rotation movement is avoided. Stroke movements are directly translated into rotational movements. Regulating valves subject to the disclosure have generally two extreme positions, namely a fully opened position for allowing a maximal flow and a completely closed position for inhibiting flow. As an example it is possible that the initial spring load is adjusted in such a way that the rotational spring of the shaft is positioned in such way that the rotational spring of the shaft is positioned that the regulating valve is pressed in closed position. This is particularly of advantage for safety relevant applications at which, for example, an emergency shutdown of the regulating valve should result in that no further flow is provided so that in case of an emergency shutdown the rotational spring moves the regulating valve into a sealing close position. Furthermore it is possible that the initial spring load is adjusted in such a way that the rotational spring load is build-up continuously only when leaving the regulating valve close position. The present disclosure also relates to the inversed case that the rotational spring is initially loading the regulating valve into the fully opened position by means of the rotational spring force. The holder according to the disclosure further allows a simple assembly and disassembly of the magnet in the holder as well as of the holder on the shaft. By the support of the rotational spring according to the disclosure on the one hand at the housing and on the other hand at the holder itself, a particularly simplified implementation of the regulating valve position detection device is achieved, since the magnet holder not only fulfills the function of holding the magnet, but additionally serves as a torque support of the rotational spring and as a guiding of the rotational spring.

According to an execution example of the holder according to the disclosure the magnet and the receptacle are formed shape-complementarily to another. In the case where the magnet is realized as a bar magnet, the receptacle also has a long stretched shape or at least two holding sections, in which one region of the form magnets of each is held. The magnet is preferably held in the receptacle shape-, force- and material-fittingly. According to a particularly easy to realize example the magnet is held in the receptacle force-fittingly, wherein particularly the magnet is over-dimensioned, compared to the receptacle, in such a way that a press fit between magnet and receptacle is established and/or the magnet is held in the receptacle exclusively by means of the sticking friction force between magnet and receptacle.

In an exemplary execution of the holder according to the disclosure, the magnet is held or is receivable, respectively, in such a way that the shaft rotation axis preferably runs centrally through the magnets and/or the magnet is aligned in the direction of the shaft turning axis at a distance to the shaft, especially at a distance to a front face of the shaft facing the magnet. The distance can be dimensioned small in order to keep the installation space small, particularly in the direction of the turning axis. For example, the distance is in a range of few millimeters. According to a further development of the holder according to the disclosure the magnet is sized in such a way that it protrudes the cross-section dimension of a shaft in at least one direction perpendicular to the turning axis. Furthermore, a cross-section dimension of the shaft in another direction different from the turning axis can be dimensioned larger than a cross-section dimension of the magnets.

According to a further exemplary execution of the holder according to the disclosure the magnet is disassemblably held or receivable in the receptacle. This particularly turns out to be of advantage during the disassembly, especially during service intervals. Preferably, the magnet is held in the receptacle by a latching. For this purpose, a force-, material- and/or shape-fitting fixing of the magnets can be established when mounting. According to a further development of the holder according to the disclosure the magnet has at least one rigid element like a rigid protrusion and/or a rigid recess. Furthermore, the receptacle can have at least one rigid element, like a rigid protrusion and/or a rigid recess, for latchingly fixing the magnet in the receptacle. Preferably, the at least one rigid element of the receptacle is facing the at least one rigid element of the magnet, especially in such a wax that when introducing the magnet into the receptacle the respective latching element are latching into each other in order to fix the magnet in the receptacle. Furthermore, the release mechanism for releasing the latching and for allowing a disassembly of the holder from the receptacle can be provided. The latching engagement between respective latching elements corresponding to another can be released on activation of the release mechanism.

In a further exemplary execution of the holder according to the disclosure the fixing section is formed by a circumferentiating flange extending at an angle relative to the turning axis, preferably in the range of 85% to 95%, particularly of 90%. The flange can be dimensioned for example as a ring flange. As an example, the ring flange has a passage opening aligned centrally, which is, in the assembled state of the holder, lying coaxially with the shaft rotation axis and can be slit over the holder, especially the holding section, in the direction of the turning axis on the shaft. Preferably, the fixing section is shape-fitted to the shaft diameter in such a way that the fixing section is fixed to the shaft form- and/or force-fittingly, particularly by a press fitting. In other words, the inner diameter of the fixing section, particularly of the passage opening, can for example be dimensioned slightly smaller than the outer diameter of the shaft.

According to a further exemplary execution the holder can be connected to the shaft preferably additionally by means of a fixing part, like a securing ring, a screw, a welded joint or such. The fixing part is particularly designated to connect the fixing section with the shaft torque transferringly. That means that a shaft rotation is directly translated into a holder rotation movement.

In an exemplary execution of the holder according to the disclosure the support section is formed in such a way that it is encompassable by a particularly hook or knuckle-shaped end of the rotational spring. In particular, the support section provides a protrusion and/or a recess, which can encompass the end of the rotational spring and on which the rotational spring and can support itself in order to build up a rotational spring force on shaft rotation movement. By that a simple constructive solution is provided, which allows a correspondingly easy to implement assembly of the rotational spring or the holder, respectively. A hook or knuckle dimension of the rotational spring and a dimension of the protrusion/the recess of the holder are thereby preferably adjusted to one another.

According to a further development of the holder according to the disclosure the support section has a preferably circumferentiating guiding limb extending essentially in the direction of the turning axis for supporting at least one region of the rotational spring. The rotational spring is guided by the guiding limb at least in sections in the direction of the turning axis, preferably when building up the rotational spring force. The rotational spring is butting against the guiding limb at least section-wise in the direction of the turning axis so that the guiding limb provides a stop unit, preferably a radial stop unit, for the rotational spring.

In a further exemplary execution, the holder is of plastic, preferably made in one piece, particularly by injection molding process. The holder can be made alternatively of further suitable non-magnetic, preferably light, materials.

According to a further aspect of the present disclosure a regulating valve position detection device is provided for regulating valve of a process plant, like a chemical plant, a food processing plant, a power plant or such. This serves for taping a regulating valve position/attitude of an arbitrary position (i.e. at an arbitrary component) of the regulating valve.

The regulating valve position detection device has a housing. The housing can for example be formed multi-parted, particularly two-parted, and include a base part and a cover part to be mounted on that. The regulating valve position detection device further includes a shaft turnably movable in the housing, defining a rotation axis.

According to the disclosure, the regulating valve position detection device has a holder for a magnet, wherein the holder is designed preferably according to the exemplary executions described with regard to the first aspect according to the disclosure. According to that, the executions described with regard to the first aspect according to the disclosure, in which a holder for a magnet according to the disclosure was described, are transferrable in analogous way to the second aspect according to the disclosure. A magnet is held in the holder preferably clampingly. The clamping of the magnet has the advantage of a simple and fast assembly. Furthermore, no further fixing elements are needed, wherein it is also possible to provide additional fixing parts. A magnet can, for example, be a long stretched bar magnet, preferably permanent magnet. A rotational spring orientated parallel to the shaft turning axis is supporting itself on the one hand at the housing and on the other hand at the holder especially interlockingly. By means of the regulating valve position detection device according to the disclosure a significantly more accurate position detection at a delay as little as possible can be achieved, since an initial spring load of the shaft involves a rotational spring force provided via the rotational spring, by which a play-free taping of the regulating valve position is possible. The supporting of the rotational spring according to the disclosure on the one hand at the housing and on the other hand at the holder itself results in a particularly simplified execution of a regulating valve position detection device, since the magnet holder not only fulfills the function of the holding the magnet anymore, but additionally serves as torque support of the rotational spring and for the guiding of the rotational spring.

In an exemplary execution of the regulating valve position detection device according to the disclosure, the device includes a lever arm rotatable-fixedly connected to the shaft, which is coupled to the regulating valve in such a way that a regulating valve stroke movement by the lever arm is transferable to a shaft rotation movement. A pin positionable at different positions of the lever arm cooperates with a connecting member attached to the regulating valve and translates the stroke movement thereby into a rotational movement. It shall be clear, that different stroke amplitudes can be taped by different lever arm lengths and by different positions of the pins at the lever arm. The pin is thereby guided in an oblong hole that is for example formed in a connecting member, wherein for example also an edge is sufficient for guiding the pins. Furthermore, press-on rollers can be aligned between the lever arm and the connecting member in such a way that when translating a regulating valve stroke movement into a shaft rotational movement, a relative movement between a contact point of the lever arm and the connecting member is present, so that the press-on rollers roll off at the connecting member in order to allow a guided, preferably wear-free, relative movement.

Furthermore, the regulating valve position detection device according to the disclosure can have a magnet-sensitive rotation angle sensor, like an encoder, attached to the housing for detecting the shaft rotation movement.

According to an exemplary execution of the regulating valve position detection device according to the disclosure, the magnet-sensitive rotation angle sensor is facing the magnet in such a way that a change in the magnetic field is detected on shaft rotation movement. By this change it can be concluded to the shaft rotation movement and therefore also to the regulating valve stroke movement, from which the regulating valve position can be deduced.

At an exemplary execution of the regulating valve position detection device according to the disclosure the magnet is held in the holder in such a way that a shaft turning axis runs preferably central through the magnets and/or the magnet is aligned in the direction of the shaft rotation axis at a distance to the shaft, especially at a distance to the front face of the shaft facing one of the magnets. The distance can thereby be dimensioned small in order to keep the installation space small, especially in direction of the turning axis. The distance is, for example, in the range of few centimeters. According to a further development of the regulating valve position detection device according to the disclosure the magnet is dimensioned in such way that it protrudes a cross-section dimension of the shaft in at least one direction perpendicular to the turning access. Furthermore, a cross-section dimension of the shaft in a direction other than the turning axis can be larger than a cross-section dimension of the magnets. Furthermore, a middle axis of the magnet-sensitive rotation angle sensor and a middle axis of the magnets can be oriented parallel to each other, preferably coaxial.

In a further exemplary execution, the regulating valve position detection device according to the disclosure has a rotational spring, which for example is a torsion spring, preferably a screw spring, has at least a hook- or knuckle-shaped end. Moreover, at least one protrusion and/or a recess can be formed in the holder, respectively. The rotational spring axis preferably supports itself with the rotational spring ends in such a way at the housing and/or at the holder that at least one hook- or knuckle-shaped end encompasses the at least one protrusion and/or the at least one recess in the holder and/or the housing to build-up shaft rotation movements. By that a simple constructive solution of the regulating valve position detection device is provided which likewise allows a simple-to-implement assembly of the rotational spring or the holder, respectively. A dimension of the hook or knuckle of the rotational spring ends and a dimension of the protrusions/the recess of the holder and/or the housing is likewise adjusted to another.

According to a further aspect of the current disclosure a regulating valve for regulating a process fluid flow in a process plant, like a chemical plant, a food processing plant, a power plant or such is provided. The regulating valve according to the disclosure hereby includes a regulating valve position detection device according to the second aspect according to the disclosure of the present disclosure, which preferably includes a holder for a magnet according to the first aspect according to the disclosure of the present disclosure. According to that, the executions described above relating to the first and to the second aspect according to the disclosure, in which a holder for a magnet according to the disclosure and a regulating valve position detection device according to the disclosure is described, are transferable in an analogous manner to the third aspect according to the disclosure.

In the following description of exemplary executions according to the disclosure the holder for a magnet according to the disclosure is generally assigned with reference numeral 1 and a regulating valve position detection device according to the disclosure is generally attributed with the reference numeral 3.

Figure 1:
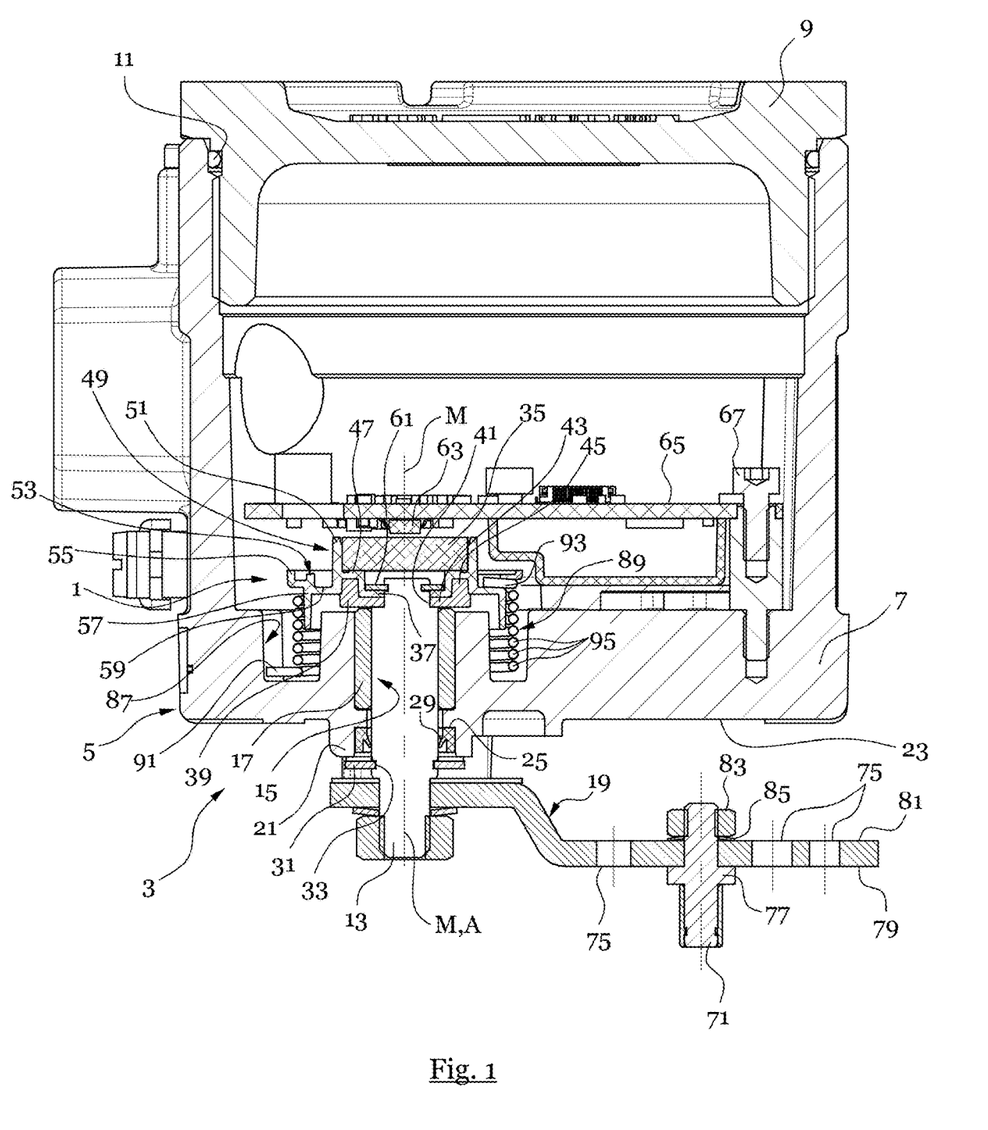
FIG. 1 is a cross-section view of a regulating valve position detection device according an exemplary embodiment of the present disclosure.

FIG. 1 illustrates the regulating valve position detection device 3 shown in the cross-sectional view. In an exemplary embodiment, the regulating valve position detection device 3 has a housing 5, which is formed multi-parted and has a lower base part 7 as well as an upper cover part 9. The cover part 9 finishes the base part 7 sealingly, wherein an additional sealing element, like a sealing ring 11, is designated between base part 7 and cover part 9. A shaft 13 is supported turnably movably in the housing 5 or the base part 7, respectively. The shaft 13 can therefore rotate around a turning axis A, which resembles a middle axis M of the shaft, and is axially secured in the direction of the turning axis A. This direction will be denoted in the following description also as axial direction. By that, the shaft 13 is secured axiarily in relation to the bottom part 7 or its position is defined in axial direction A in relation to the base part 7, respectively. The base part 7 has a passage drill hole 15, in which shaft 13 is aligned. Shaft 13 is thereby aligned in the passage opening 15 in such a way that the shaft 13 protrudes a corresponding dimension of the base part 7 in axial direction A. The shaft 13 is encompassed by a guiding 17 at least axial section-wise, which allows a low-friction and low-wear rotation of the shaft 13 regarding the housing base part 7. The guiding 17 is for example formed as a hollow-cylindrical sleeve. Outside the regulating valve position detection device 5, which means below the base part 7 according to FIG. 1, the shaft 13 is connected rotationably fixed with a lever arm 19 which will be described in detail below. The base part 7 has a circumferential inlet nozzle 21 at the bottom 23 of the base part 7, which encompasses the passage opening 15. The inner diameter defined by the inlet nozzle 21 is thereby dimensioned larger than the inner diameter of the passage opening 15, such that a radial edge 25 is formed at the housing base part 7. In the interspace between shaft 13 and nozzle 21 a sealing 27 is introduced, which for example can have a clamping arm 29, which can deform elastically and can be pressed against a circumferential surface of the shaft 13. An axial securing ring 31 is the nozzle 21 following in axial direction A that is latching in a circumferential recess 33 provided in shaft 13 and is introduced in it.

In an exemplary embodiment, holder 1 is located inside the housing 5 of the regulating valve position detection device 1 (i.e. above the housing base part 7 according to FIG. 1) in which a magnet 35 is received. The magnet 35 is for example a permanent magnet, which is formed as a bar magnet. The holder 1 has an attachment section 37, which is essentially formed as a ring flange and dimensioned in relation to the diameter of the shaft 13 in such a way that the holder 1 can be slipped on the shaft 13 in axial direction A by means of the attachment section 37 and be fixed at the shaft 13 by means of a press-fitting between attachment section 37 and shaft 13. The holder 1 is furthermore attached to the shaft turnably fixedly so that a shaft rotation movement is transferred into a holder rotation movement. In other words, holder 1 rotates with the shaft 13. As shown in FIG. 1, a perforated reinforcement metal sheet 39 is arranged at the shaft 13 and the holder 1 in order to increase the transferable torque between shaft 13 and holder 1. The reinforcement metal sheet 39 thereby has a hole 41 that is equally adapted in relation to the outer-diameter of the shaft 13 as well as to the wall 45 essentially stretching away from the bottom 43 of the reinforcement middle sheet 39 in axial direction A. The wall 45, which can also be called retaining wall, is protruding into a step arising as an ending between the attachment section 37 and a receiving bottom 47 ending from an attachment section 37, in order to support the holder 1 additionally to the torque transfer.

The receiving bottom 47 serves as a receptacle and rest of the magnets 35, respectively. As shown in FIG. 1, the magnet 35 is resting at the receiving bottom 47. The receiving bottom 47 is part of the receptacle 49 for preferably clampingly receiving and holding the magnet 35 within an interior of the receptacle 49. A receiving wall 51 is attached to the receiving bottom 47, which is described more in detail in relation to FIG. 2.

A support section 53 is attached to the receptacle 49, which for example has a scepter shape. The support section has a circumferential, outer caller 55, a guiding limb 57 attached to that, which can also be circumferentiating, and a bottom 59 stretching essentially perpendicular to the axial direction A. The holder according to the disclosure is for example of plastic and preferably made by an injection molding procedure in one piece. An axial securing 61 is the attachment section 37 for additional axial fixation of the holder 1 on the shaft 13.

A magnet-sensitive rotation angle sensor 63 is aligned on the opposite side of magnet 35. According to FIG. 1, the rotation angle sensor 63 is aligned at small distance, especially axial distance, in relation to the magnets 35 and aligned centrally in relation to the magnets 35 in such a way that the respective middle axis M are oriented to each other. The housing 5 has a flange 56 stretching essentially perpendicular to the axial direction, which is mounted on the housing 5 in a stationary manner, for example by means of a screw 67, and on which further components, which will not be explained in detail, are aligned for detection and derivation of the regulating valve position. In an exemplary embodiment, these components include processor circuitry that is configured to detect and derive the regulating valve position, where such detection and derivation can be based on information provided from sensor 63. In an exemplary embodiment, the magnet 35 is turned around its middle axis M together with the holder 1 and thereby can execute a relative rotation movement relating to the magnet-sensitive rotation angle sensor 63. In an exemplary embodiment, the sensor 63 includes processor circuitry that is configured to sense or otherwise detect an angular position of magnet 35 and to generate an output signal corresponding to the detected position. A dimension perpendicular to the axial direction A of the magnet 35 is thereby dimensioned significantly larger than the respective dimension of the magnet-sensitive sensor device 63. Also the dimension of the magnet 35 in axial direction A is dimensioned larger than the respective dimension of the magnet-sensitive angle rotation sensor 63.

The lever arm 19 that is connected turnably fixed with the shaft 13 is coupled to the regulating valve 69 (FIGS. 3, 4) in such a way, that a regulating valve stroke movement can be translated into a rotational movement of the shaft 13 by the lever arm 19. For this purpose the lever arm 19 has a pin 71 positionable at different positions along the lever arm 19, which can cooperate with a connecting member 73 (FIGS. 3, 4) that is attached at the regulating valve 69, preferably a drive rod 123 of the regulating valve 69, in order to translate the stroke movement of the regulating valve 69 into a turning movement of the shaft 13. The pin 71 is thereby supported turnably movably at an inlet opening 75 provided at the lever arm 19, wherein several of such passage openings 57 are provided along the lever arm 19 in order to facilitate the different positions of the pins 71 at the lever arm 19. The pin 71, which can also be denoted as press-on roller, rolls off at the connecting member 73 during a regulating valve stroke movement. In order to attach pin 71 at the lever arm 19 pin 71 provides a ring flange stretching perpendicular to the extension direction, which contacts a lower surface 79 of the lever arm 19, and a locking nut preferably screwed at the top side 81 of the lever arm 19, which can cooperate with a washer 85.

With reference to FIG. 1, the housing 5 has a ring-shaped channel 78 circumferentiating inside the housing base part 7 around the shaft 13. That serves to receive the guiding limb 57 and also at least partly a rotational spring 89 circumferentiatingly and surrounding the shaft 13. The rotational spring 89 is supporting itself according to the disclosure on the one hand at the housing 5 and on the other hand at the holder 1. The support at the holder 1 is explained in detail with respect to FIG. 2, the support at the housing 5 with respect to FIG. 5. The rotational spring 89 has two rotational spring ends 91, 93, which have, according to FIG. 2, a hook shape for interlockingly supporting themselves at the housing 5 or the holder 1, respectively. The rotational spring 69 is denoted in FIG. 1 by means of a single rotational spring winding 95, of which for example 3 can support themselves at the guiding limb 57 of the holder 1, as shown in FIG. 1. A rotational spring force is built up at the stationary housing 5 and the cooperatively turning holder 1 during a regulating valve stroke movement, which is transferred into a shaft rotation movement by the lever arm 19, which ensures a significantly more precise position detection of the regulating valve 69 at delays as small as possible by means of a thereby induced initial spring load on the shaft 13. Furthermore, the arrangement according to the disclosure of the regulating valve position detection device 3 according to the disclosure as well as the holder 1 according to the disclosure allows a constructively simple-to-implement solution on which axial construction space is saved additionally.

Figure 2:
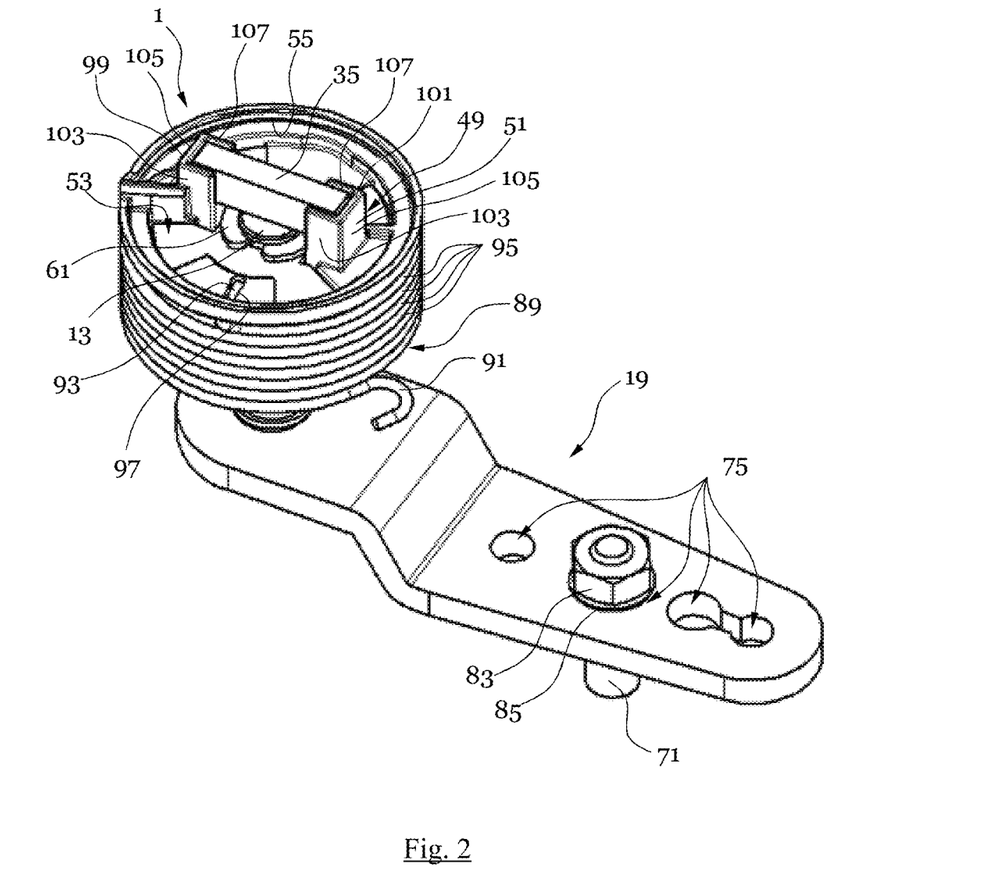
FIG. 2 is a perspective view of a holder according an exemplary embodiment of the present disclosure, in which a magnet is received and which supports a rotational spring, with a lever arm.
Figure 5:
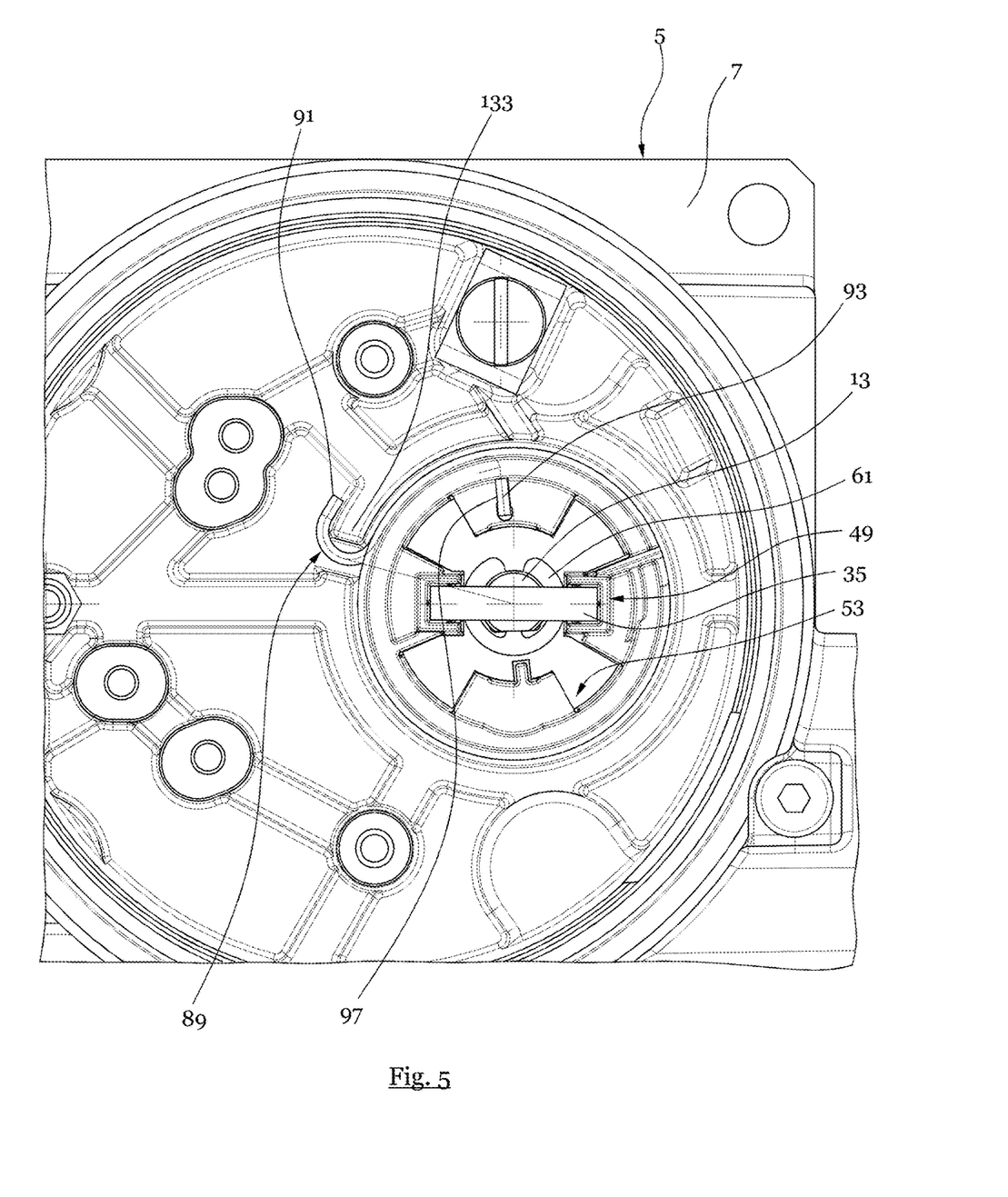
FIG. 5 is a top view of a holder according an exemplary embodiment of the present disclosure, in which a magnet is received and that supports a rotational spring, which supports itself likewise at a housing of a regulating valve position detection device.

Referring to FIG. 2, the supporting of the rotational spring 89 by means of the hook-shaped rotational spring end 93 at the holder 1 is shown. For easy understanding only, the lever arm 19 with the holder 1 according to the disclosure is shown in FIG. 2. The holder 1 is configured to receive a bar magnet 35, and the holder 1 includes the rotational spring 89, which is interlockingly attached to the holder 1 unilaterally via the one rotational spring end 93. The other rotational spring end 91, which is interlockingly attached to the housing 5, which is described in relation to FIG. 5, is freely visible, since the respective housing part is not displayed. A recess 98 is provided at the support section 53 of the holder 1, which can engage into the rotational spring end 93 in axial direction from the bottom in order to support itself at the holder and being interlockingly received in it. The rotational spring end 93 close to the holder keeps its position during the shaft rotation movement as a result of the interlockingly attachment at the holder 1 while the remaining rotational spring sections, especially all of the rotational spring windings 95, are rotating around the shafts 13 at least partly, by which the rotational spring force is building up.

Receptacle 49 is also depicted in FIG. 2, in which the magnet 35 is held clampingly. The receptacle 49 is thereby designed two-partedly and has two superimposable receptacle sections 99, 101 aligned mirrored to each other. The receptacle partial sections 99, 101 are essentially formed by a wall 51, which are formed by three wall sections 103, 105, 107 arranged to each other perpendicular oriented in pairs and by the corresponding bottom of the receptacle 49. The wall sections 103, 105, 107 thereby define an interior that is configured to receive and hold the magnet 35 within the interior. The interior may also be referred to as an interior receiving area. In embodiments where the magnet 35 is held clampingly within the interior of the receptacle 49, the receptacle 49 is configured to generate a clamping force in an inward direction towards the interior such that the clamping force acts on an exterior of the magnet 35 to clampingly hold the magnet 35 within the interior the of the receptacle 49.

Figures 3, 4:
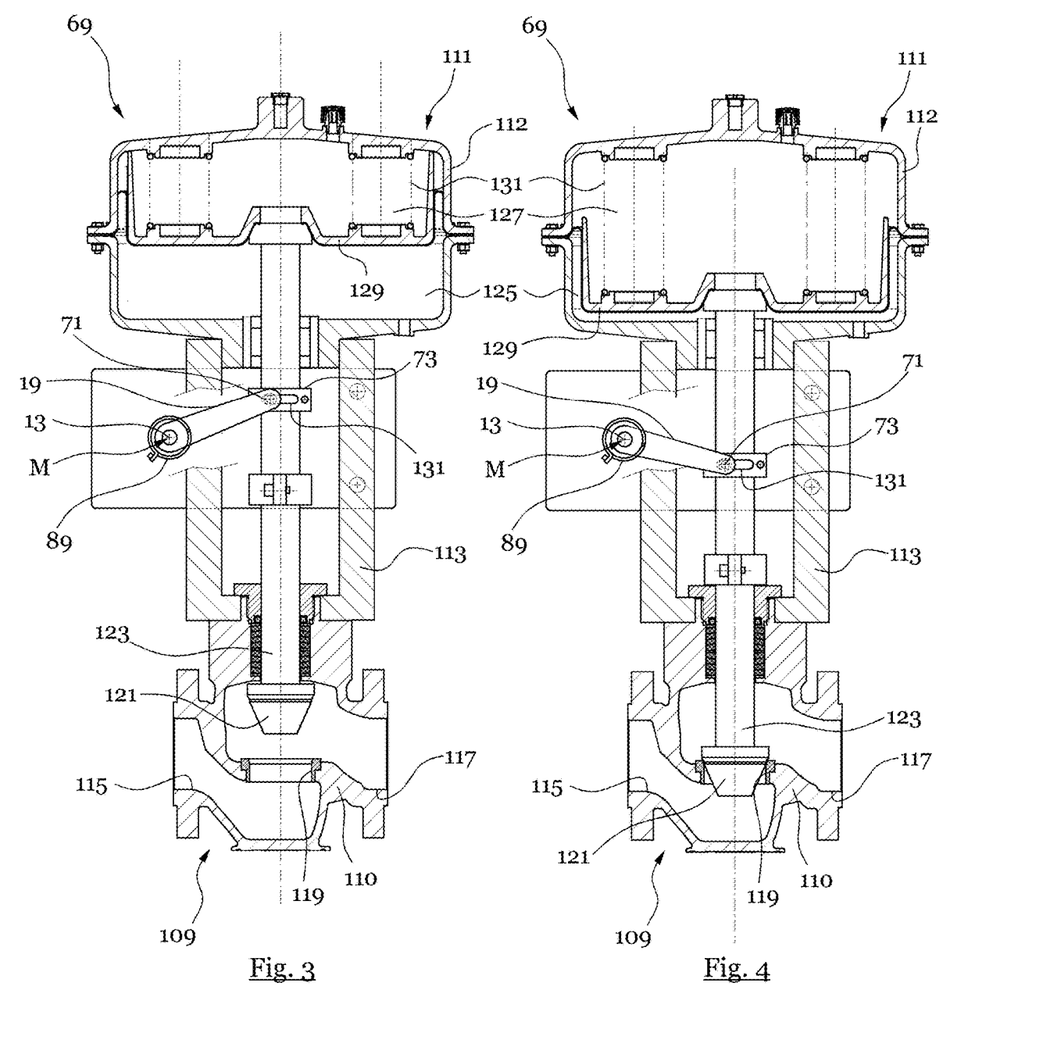
FIG. 3 is a schematic cross-section view of a regulating valve, according an exemplary embodiment of the present disclosure, in a first regulating valve position.
FIG. 4 is a schematic cross-section view of a regulating valve as shown in FIG. 3 in a further regulating valve position according an exemplary embodiment of the present disclosure.

Relating to FIGS. 3 and 4, the functionality of a regulating valve according to the disclosure is described more in detail. The field device 69 has a regulating valve 109 a preferably pneumatic actuator 111 and a yoke 113 carrying the regulating valve 109 and the actuator 111 in a stationary manner. The regulating valve 109 is integrated in the tube system of a process plant, wherein the tube socket for the flow-inlet tube is denoted with the reference numeral 115 and a flow outlet tube with the reference numeral 117. A valve seat 119 is stationarily fixed inside the housing 110 of the regulating valve 109, which cooperates with a valve member 121, which is operated by the drive rod 123 of the pneumatic actuator 111. The drive rod 123 extends through an opening in the upper part of the regulating valve housing 110 along the yoke 113 in a passage through the housing 112 of the actuator 11 and is fixed permanently with one of the partitioning surfaces 129, for example formed as membranes, separating the two working chambers 125, 127 of the pneumatic actuator 111.

The actuator 111 is a working chamber 125 and a restoring chamber 127. The pneumatic working chamber 125 is pneumatically connected with a valve control (not depicted) which can be coupled to a pressured air source (not depicted) of approximately 6 bar. The valve control, which can for example be aligned and integrated into the regulating valve position detection device according to the disclosure, is linked in such a way with the regulating valve position detection device 3 according to the disclosure that a position control command can be generated as a result of a regulating valve position captured, which can be submitted to the actuator via the position control in order to move the regulating valve 69.

As already described with regard to FIG. 1, the guiding member 73 is mounted permanently to the drive rod 123, so that the connecting member is following a drive rod movement. The lever arm 19 is supported at the connecting member 73 in a turnably moveable manner via the pin 71, wherein the pin 71 can roll off in an oblong hole 131 introduced into connecting member 73 as a result of a drive rod stroke movement so that a rotation of the lever arm is involved. The rotation of the lever arm 19 thereby essentially occurs around the shaft 13 or its middle axis M, respectively, shown in FIGS. 3 and 4 merely schematically. Furthermore, the rotational spring 89 is shown in FIGS. 3 and 4 schematically, which is building up a rotational spring force as a result of a drive rod stroke movement, which is translated into a shaft rotation movement via the lever arm 19.

FIG. 5 shows a top view of a cutout of the housing 5, particularly of the housing base part 7. In this example, the support of the rotational spring 89 by means of the rotational spring end 91 at the side of the housing, which is formed as a hook, is illustrated. A correspondingly formed protrusion 133 at the housing 5 is provided and dimensioned in such a way that the hook-shaped turn spring end 91 can support itself at the protrusion 133 and encompass same. By encompassing the housing-fixed, stationary protrusion 133 by the turn spring end 91 the turn spring end 91 keeps its position during a drive rod stroke movement, which leads to a shaft rotation movement, whereby the other regions of the rotational spring 89, particularly the rotational spring windings 95, are rotating around the shaft turn axis and thereby a turn spring force is established between the two turn spring ends 91, 93. With regard to the accommodation of the magnet in the holder 1 as well as in relation to the support of the turn spring 89 on the side of the holder at the holder 1 it is referred to the previous explanations.

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof.

Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. A circuit includes an analog circuit, a digital circuit, state machine logic, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST 1 holder
3 regulating valve position detection device
5 housing
7 base part
9 cover part
11 seal ring
13 shaft
15 passage opening
17 guiding
19 lever arm
21 nozzle
23 lover surface
25 radial edge
27 sealing
29 clamping arm
31 axial securing ring
33 recess
35 magnet
37 fixing section
39 reinforcing metal sheet
41 hole
43 bottom
45 wall
47 holding bottom
49 receptacle
51 receptacle wall
53 supporting section
55 collar
57 guiding limb
59 bottom
61 axial securing
63 rotation angle sensor
65 flange
67 screw
69 regulating valve
71 pin
73 connecting member
75 passage opening
77 flange
79 lower side
81 upper side
83 locking nut
85 washer
87 channel
89 rotational spring
91, 93 rotational spring end
93 rotational spring winding
95 recess
99, 101 holding part section
103, 105, 107 wall section
109 regulating valve
110 housing
111 actuator
112 housing
113 yoke
115 flow inlet tube
117 flow outlet pipe
119 valve seat
121 valve member
123 drive rod
125, 127 working chamber
129 partition surface
131 compression spring
133 protrusion

The invention claimed is:

1. A holder for a magnet of a magnet sensitive regulating valve position detection device of a regulating valve, the regulating valve position detection device having a shaft turnably movable supported in a housing of the regulating valve position detection device, the shaft defining a turning axis oriented parallel to a rotational spring supporting itself at the housing, and having a lever arm being turnably fixed with the shaft, the lever arm being coupled to the regulating valve in such a way that a regulating valve stroke movement by the lever arm is transferable into a shaft rotation movement, the holder comprising: a receptacle configured to hold the magnet within the receptacle, the magnet being overdimensioned with respect to the receptacle such that a press fit between magnet and receptacle is employed, wherein the receptacle includes first and second sections that are configured to respectively engage first and second opposite ends of the magnet, the first and second sections being completely disjoined and spaced from each other in a mirrored relationship, and a middle portion of the magnet between the first and second ends of the magnet being separated and spaced from both the first and second sections of the receptacle; a fixing section connected to the receptacle and configured to turnably fix the holder at the shaft; and a support connected to the receptacle and the fixing section, the support configured to latchingly support the rotational spring to generate a rotational spring force on the shaft rotation movement.

2. The holder according to claim 1, wherein the magnet and the receptacle are formed so as to be complementary shaped to another.

3. The holder according to claim 2, wherein the receptacle is configured to receive the magnet and the magnet is fittingly held in an interior of the receptacle.

4. The holder according to claim 1, wherein the magnet is held in the receptacle such that the turning axis extends centrally through the magnet and/or the magnet is aligned in a direction of the turning axis at a distance to the turning axis, and wherein the magnet is dimensioned such that the magnet protrudes a cross-section dimension of the shaft.

5. The holder according to claim 1, wherein: the magnet is receivable and removably held in the receptacle; the magnet is further held in the receptacle by a latching; and the magnet includes at least one latch and the receptacle includes at least one latch corresponding to the latch of the magnet to latchingly fix the magnet in the receptacle.

6. The holder according to claim 1, wherein the fixing section is formed by a circumferentiating ring flange extending at an angle relative to the turning axis, the fixing section being shape-adapted in relation to a shaft diameter of the shaft such that the fixing section is fixed to the shaft by a press fit.

7. The holder according to claim 1, wherein the holder is connected to the shaft by a fastener, the fastener torque-transferringly connecting the fixing section to the shaft.

8. The holder according to claim 1, wherein the support being formed such that the support is encompassable by a hook-or knuckle-shaped end of the rotational spring, wherein the support includes a protrusion or a recess on which the end of the rotational spring supports itself.

9. The holder according to claim 8, wherein the support includes a guiding limb circumferentiatingly extending in a direction of the turning axis to support at least one region of the rotational spring, wherein the guiding limb is directly attached to the protrusion or the recess.

10. The holder according to claim 1, wherein the holder is plastic and is integrally formed being made by injection molding.

11. The holder according to claim 1, wherein the regulating valve is of a process plant, wherein the process plant includes a chemical plant, a food processing plant, or a power plant.

12. The holder according to claim 1, wherein: each of the first and the second sections comprise: first and second sidewall sections connected together by end-wall and bottom sections disposed therebetween, the first and the second sections defining respective interior receiving areas configured to receive and hold the magnet; and the first and the second sidewall sections and the bottom section of the first section being opposite and spaced from the first and the second sidewall sections and the bottom section of the second section.

13. The holder according to claim 12, wherein the first and second sections are U-shaped.

14. The holder according to claim 1, wherein the receptacle includes an interior receiving area that is configured to receive and hold the magnet therein, the receptacle being configured to generate a clamping force in an inward direction towards the interior receiving area such that the clamping force acts on an exterior of the magnet to clamplingly hold the magnet in the interior receiving area.

15. A regulating valve position detector for a regulating valve of a process plant, comprising: a housing; a shaft being rotatably movably supported in the housing, the shaft defining a turning axis; and a holder that includes: a receptacle configured to hold a magnet within the receptacle, the magnet being over-dimensioned with respect to the receptacle such that a press fit between magnet and receptacle is employed, wherein the receptacle includes first and second sections that are configured to respectively engage first and second opposite ends of the magnet, the first and second sections being completely disjoined and spaced from each other in a mirrored relationship, and a middle portion of the magnet between the first and second ends of the magnet being separated and spaced from both the first and second sections of the receptacle; a fixing section connected to the receptacle and configured to turnably fix the holder at the shaft; and a support connected to the receptacle and the fixing section, the support configured to latchingly support a rotational spring to generate a rotational spring force on a shaft rotation movement, wherein the rotational spring is oriented parallel to the turning axis and is latchingly self-supported at the housing and the holder.

16. The regulating valve position detector according to claim 15, further comprising:
a lever arm turningly fixed to the shaft and coupled to the regulating valve such that a regulating valve stroke movement is transferable into the shaft rotation movement by the lever arm; and
a magnet sensitive rotation angle sensor aligned at the housing and configured to sense the shaft rotation movement.

17. The regulating valve position detector according to claim 16, wherein the magnet sensitive rotation angle sensor is aligned to the magnet such that the magnet sensitive rotation angle sensor is configured to detect a change in a magnetic field based on the shaft rotation movement.

18. The regulating valve position detector according to claim 15, wherein the holder is configured to hold the magnet such that: the turning axis extends centrally through the magnet and/or the magnet is dimensioned such that the magnet protrudes a cross-section dimension of the shaft, and/or a middle axis of a magnet sensitive rotation angle sensor and a middle axis of the magnet are coaxially oriented.

19. The regulating valve position detector according to claim 15, wherein the rotational spring includes at least a hook- or knuckle-shaped end, the holder and/or the housing including at least one protrusion and/or one recess formed therein, wherein the at least one hook- or knuckle-shaped rotational spring end encompassing the at least one protrusion and/or recess in the holder and/or the housing to support the rotational spring.

20. A regulating valve configured to regulate a process fluid flow in the process plant, comprising the regulating valve position detector according to claim 15.

21. A holder for a magnet of a magnet sensitive regulating valve position detection device of a regulating valve, the regulating valve position detection device having a shaft turnably movable supported in a housing of the regulating valve position detection device, the shaft defining a turning axis oriented parallel to a rotational spring supporting itself at the housing, and having a lever arm being turnably fixed with the shaft, the lever arm being coupled to the regulating valve in such a way that a regulating valve stroke movement by the lever arm is transferable into a shaft rotation movement, the holder comprising: a receptacle configured to hold the magnet within the receptacle, the magnet being over-dimensioned with respect to the receptacle such that a press fit between magnet and receptacle is employed, wherein the receptacle includes first and second sections that are configured to respectively engage first and second opposite ends of the magnet, the first and second sections being completely disjoined and spaced from each other in a mirrored relationship, and a middle portion of the magnet between the first and second ends of the magnet being separated and spaced from both the first and second sections of the receptacle; a fixing section connected to the receptacle and configured to turnably fix the holder at the shaft, wherein the fixing section includes a fastener, the holder being connected to the shaft by the fastener; and a support connected to the receptacle and the fixing section, the support configured to latchingly support the rotational spring to generate a rotational spring force on the shaft rotation movement.

\* \* \* \* \*